(No Model.)
T. BEVAN.
ROPE CLAMP FOR PULLEY LINES.
No. 518,132. Patented Apr. 10, 1894.
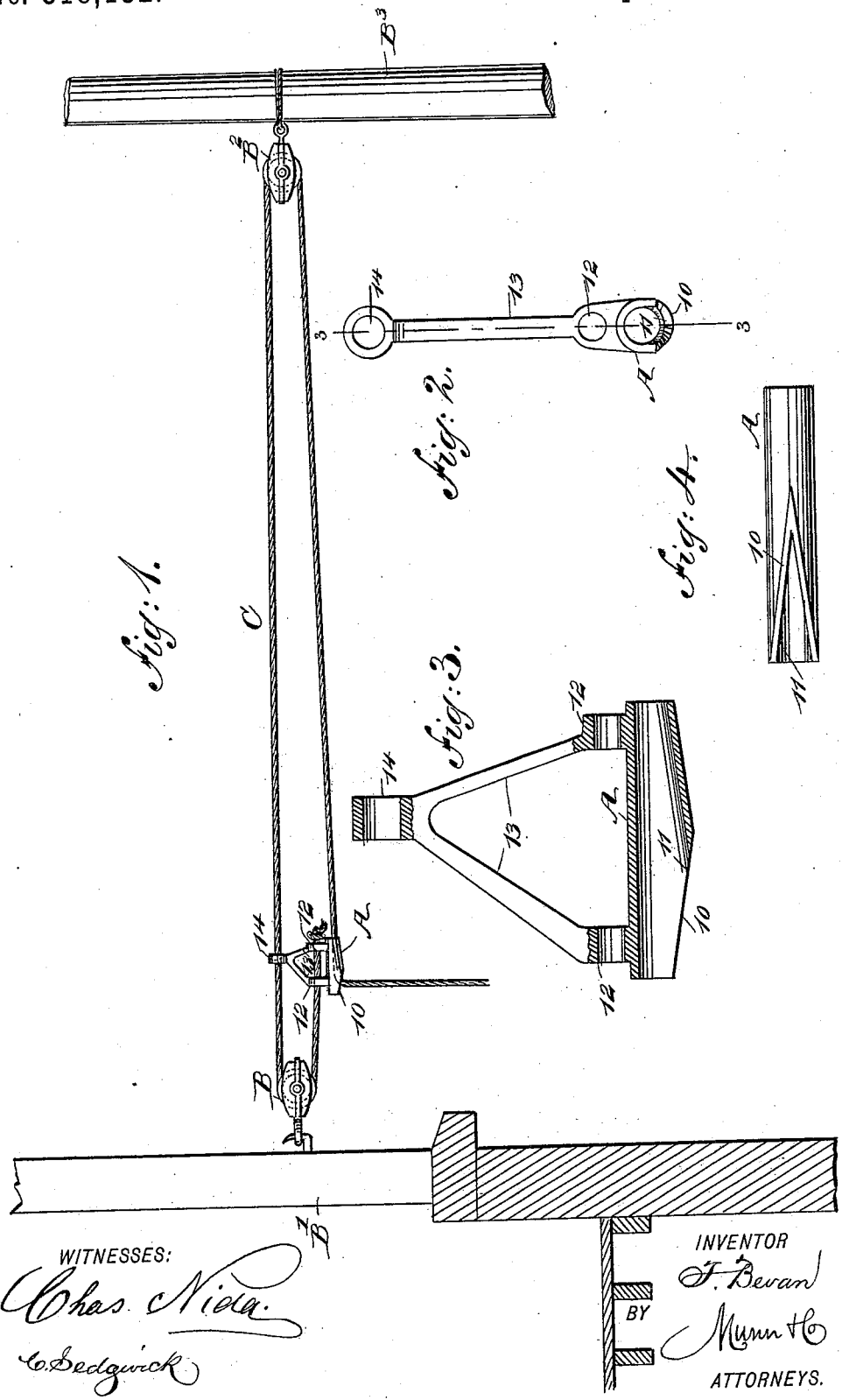
WITNESSES:
Chas. Nida.
C. Sedgwick
INVENTOR
T. Bevan
BY
Munn & Co
ATTORNEYS.

UNITED STATES PATENT OFFICE.

THOMAS BEVAN, OF NEW YORK, N. Y.

ROPE-CLAMP FOR PULLEY-LINES.

SPECIFICATION forming part of Letters Patent No. 518,132, dated April 10, 1894.

Application filed November 14, 1893. Serial No. 490,934. (No model.)

*To all whom it may concern:*

Be it known that I, THOMAS BEVAN, of New York city, in the county and State of New York, have invented a new and Improved Rope-Clamp for Pulley-Lines, of which the following is a full, clear, and exact description.

My invention relates to a rope clamp for pulley lines, and it has for its object to provide a clamp adapted for uniting or connecting the ends of a pulley line, which clamp will be so constructed that it may be applied by any one of ordinary intelligence and one end of the rope loosened from the clamp and the slack taken up without danger to the operator, since the manipulation of the loosened end of the line will always be in direction of the apartment from which the person is manipulating the line.

Another feature of the invention is to so construct the clamp that the end of the line that is capable of being freed may be locked in the clamp expeditiously and conveniently, and likewise without danger to the manipulator.

A further feature of the invention is to combine a guide with the rope clamp, which will prevent the under stretch of the line from sagging from or leaving the upper stretch for too great a distance.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a view illustrating the application of the device to a pulley line, the device appearing in side elevation. Fig. 2 is an end view of the device. Fig. 3 is a central longitudinal and vertical section, taken practically on the line 3—3 of Fig. 2; and Fig. 4 is a bottom plan view of the device.

The body A of the device is tubular, and is preferably made of greatest diameter at or near its center, as is shown in Figs. 1 and 3. The bottom of the body is beveled upwardly from the center in direction of and to one of its ends, which end may be denominated the front end of the body; and in the beveled portion 10 of the body an angular slot 11, is produced, preferably V-shaped, as shown in Fig. 4, the contracted end of the slot being at or near the central portion of the body.

The bore or chamber of the body A, is made of sufficient size to loosely receive a pulley line when passed through it, and the end of the line passed through the body may be anchored or locked by forcing the line downward through the slot 11, until it is clamped between the walls of the narrower portion of the said slot 11. The walls of the slot may be slightly rounded, but are preferably made somewhat abrupt, and if in practice it is found desirable the walls may be roughened or toothed. Eyes 12, are formed upon the top of the body, one near each end, and a substantially inverted V-shaped hanger 13 is connected at the lower extremities of its members with the eyes 12, the said hanger having formed integral therewith or attached thereto at its upper contracted end an eye 14, which is preferably of greater diameter than the lower eyes 12. One member of the V-shaped hanger 13 has more inclination than the other member, the decidedly inclined member being at the front portion of the device. By this means when the device is supported from the eye 14 the body A will be held in a horizontal position, as shown in Fig. 1, no matter how much frictional engagement there may be at the said eye 14.

In applying the device, the usual pulley B, is attached at or near the window opening B', through which the clothes are to be passed when they are to be placed upon the pulley line C. The pulley line C, is passed over the pulley B and over a second pulley $B^2$ attached to a pole $B^3$, or other support. One end of the pulley line C is passed through both the eyes 12 of the device from the front, and after being passed through said eyes, this end of the line is knotted, as shown in Fig. 1, or provided with a stop which can not be drawn through the eyes, while the upper stretch of the pulley line is made to pass loosely through the upper eye 14 of the device. The other end of the line, after passing over the outer pulley $B^2$, is passed loosely through the chamber or bore of the body A, and by carrying this end of the line downward through the contracted portion of the body slot 11, the two ends of the line will be connected through the medium of the clamp. In the event the line is to be tightened, the pendent end of the pulley line is drawn upward until the line is released from the slot in the body, whereupon, by drawing upon this end of the line in direction of the window opening B', the line may be tightened to any desired degree, and when sufficiently taut, the free end of the line is suffered to drop into the said body slot 11, and will be held in locking engagement therewith.

It will be observed that in manipulating the pulley line clamp, all of the pulling is done in direction of the apartment in which the operator is standing, and consequently there is no tendency to draw the operator out through the opening through which the clothes are to be passed. Furthermore, the device is exceedingly simple, and it is so constructed that it engages with both stretchers of the line, thus preventing the two stretchers from sagging too far apart, and furthermore the device may be made to travel in direction of either pulley.

In Fig. 1 the device is shown in the position which it should occupy just prior to the clothes being placed upon the line, although the device may be carried to and left at any point in the length of the line.

Having thus described my invention, I claim as new and desire to secure by Letters Patent—

1. In a pulley line clamp, a tubular body having a beveled under surface at one end, and a substantially V-slot produced in the said beveled surface, the contracted portion of the slot being at its inner end, and eyes located upon the top of the body, as and for the purpose set forth.

2. In a pulley line clamp, a tubular body provided with a substantially V-shaped slot in its under surface and extending from one end in direction of the center, eyes formed upon the top of the body, one near each end, and a third eye located above and between the body eyes and connected with both of them, as and for the purpose set forth.

3. A pulley line clamp, the same consisting of a tubular body having its under surface beveled at one end, and the beveled surface provided with an angular slot tapering from the end in direction of the center of the body, eyes formed upon the top of the body, one near each end, a hanger connected with both of the eyes, and a third eye carried by the hanger, above and between the lower or body eyes, as and for the purpose specified.

THOMAS BEVAN.

Witnesses:
J. FRED. ACKER,
E. M. CLARK.